J. J. DOLAN, Sr.
TOOL HOLDER.
APPLICATION FILED SEPT. 15, 1919.

1,379,539.  Patented May 24, 1921.

Witness
Chas. L. Griesbauer

Inventor
J. J. Dolan, Sr.
By E. B. McBath
Attorney

UNITED STATES PATENT OFFICE.

JOHN J. DOLAN, SR., OF DUQUESNE, PENNSYLVANIA.

TOOL-HOLDER.

1,379,539.                  Specification of Letters Patent.      Patented May 24, 1921.

Application filed September 15, 1919. Serial No. 323,819.

*To all whom it may concern:*

Be it known that I, JOHN J. DOLAN, Sr., a citizen of the United States, residing at Duquesne, in the county of Allegheny and the State of Pennsylvania, have invented certain new and useful Improvements in Tool-Holders, of which the following is a specification.

This invention relates to improvements in lathe tool holders and especially to means for holding a boring or drilling bar. The object of the invention is to hold said bar firmly but at the same time to allow it to be quickly and easily released. In many instances tools held by the old methods would break and a chisel would have to be used to release the bar or tool.

While the present invention is illustrated as a holder for a drilling or boring bar it is adapted for use in connection with any tool to be held in a tool holder or in connection with a boring, drilling or cutting machine.

The invention also consists in the novel features of construction hereinafter described, pointed out in the claim, and shown in the accompanying drawings, in which:—

Figure 1:
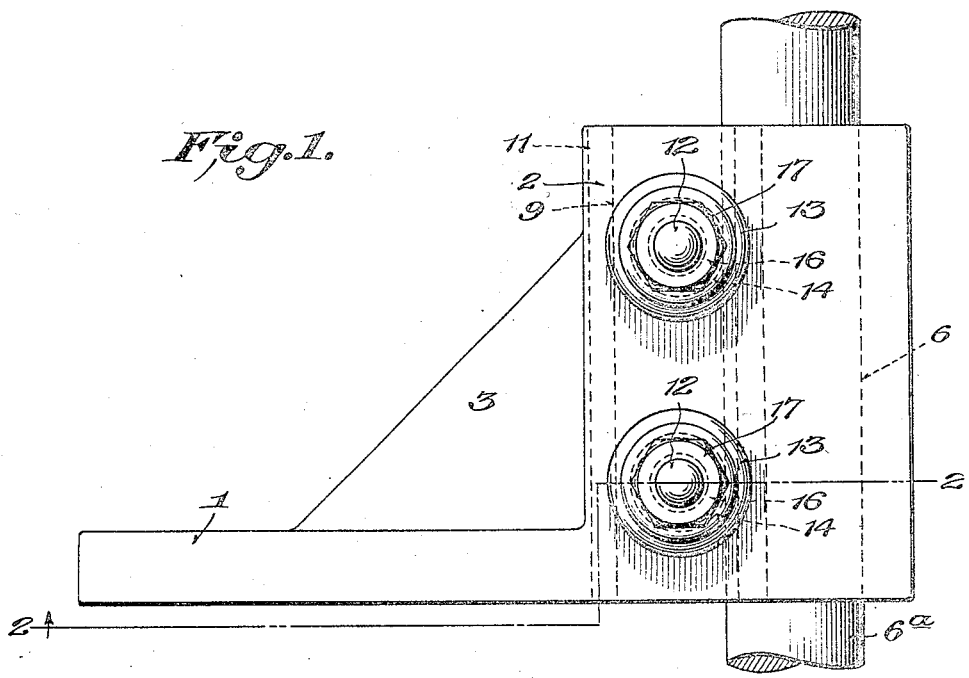
Figure 1 is a top plan view of a tool holder.
Figure 2:
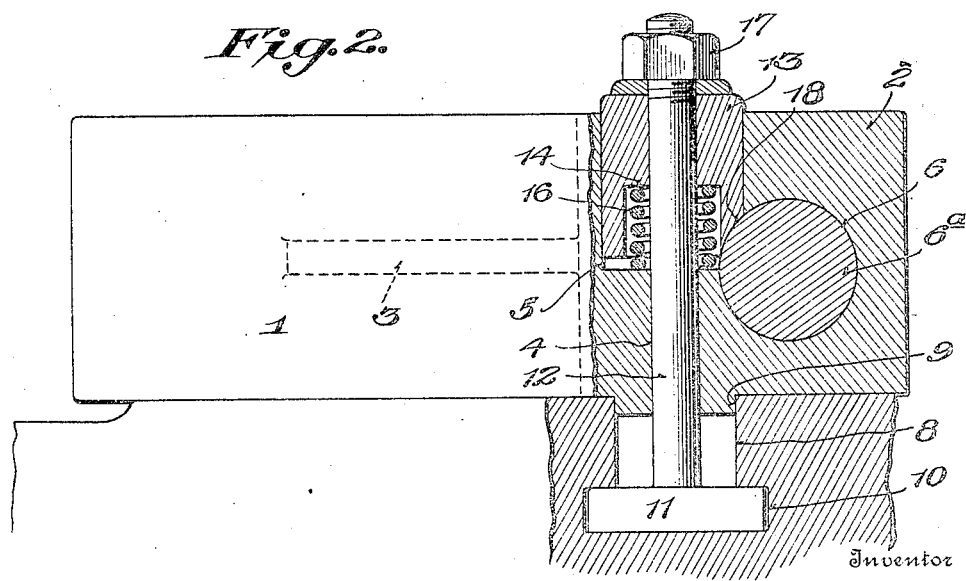
Fig. 2 is a section on the line 2—2 of Fig. 1.

In the drawing 1 designates a plate having thereon a tool holder or post 2, a web 3 connecting the post to the plate 1.

As shown the tool post or holder is provided with two horizontal bores 4, said bores opening into a side recess 5 cylindrical in form.

The tool or bar receiving bore 6 extends through the holder at right angles to the bores 4 and communicates through a portion of its arc with the recesses 5, also two in number.

The bar 6ª fits in the bore 6. The compound rest of the lathe, 7, is recessed as at 8, to receive a longitudinal rib 9, on the holder, and is also provided with a slot or groove 10 which communicates at its outer side with the recess 8. The slot 10 is of greater width than the recess 8. A slot plate 11 slidably fits in the slot 10 and carries two parallel studs 12 which pass through the bores 4. A bushing 14 is fitted over each stud and fits snugly in the recess 5 through which the stud also passes. The inner ends of these bushings are recessed as at 14. Coil springs 16 fit in said bushing recesses and encircle the studs and space the bushings from the inner ends of the recesses. The outer ends of the studs are threaded and nuts 17 work thereon and force the bushings inwardly against tension of the springs.

On one side, where the bore 6 communicates with the recesses, the bushings are cut away on an arc equal to that of the bore 6 and bear with a firm grip on the boring bar or other tool shank. The degree of gripping action is regulated by the nuts 17. When said nuts are loosened the springs 16 force the bushings outwardly to an extent sufficient to release the bar and permit its ready removal from the holder.

The advantages of such a holder will be apparent to those using devices of this kind.

What I claim is:—

In a device of the kind described, a lathe rest having a recess and a groove communicating with the recess, the groove being of greater width than the recess, a tool holder having a longitudinal rib adapted to enter the recess of the lathe rest, said holder having a tool receiving bore and having communicating bores at right angles thereto, a plate slidably fitting in the groove of the rest, studs carried by said plate and entering the last mentioned bores, respectively, bushings fitting on said studs and having their inner ends recessed, nuts working on the outer ends of the studs, and coiled springs encircling the studs and resting in the recessed ends of the bushings, the bushings being cut away on one side on an arc equal to that of the tool receiving bore.

In testimony whereof I affix my signature.

JOHN J. DOLAN, SR.